United States Patent [19]

Tanaka

[11] Patent Number: 4,787,083

[45] Date of Patent: Nov. 22, 1988

[54] BUS-METHOD COMMUNICATION NETWORK SYSTEM CAPABLE OF SEIZING TRANSMISSION RIGHT BY USING TIMER MEANS AT EACH STATION

[75] Inventor: Naotami Tanaka, Kawasaki, Japan

[73] Assignee: Nitsuko Limited, Kawasaki, Japan

[21] Appl. No.: 103,189

[22] Filed: Sep. 30, 1987

[51] Int. Cl.[4] .......................................... H04Q 11/04
[52] U.S. Cl. ...................................... 370/85; 370/92; 340/825.5
[58] Field of Search ...................... 370/85, 86, 89, 92; 340/825.5, 825.51

[56] References Cited

U.S. PATENT DOCUMENTS

| 4,516,205 | 5/1985 | Eing et al. | 370/85 |
| 4,566,098 | 1/1986 | Gammage et al. | 370/89 |
| 4,689,786 | 8/1987 | Sidhu et al. | 370/92 |

Primary Examiner—Douglas W. Olms
Assistant Examiner—Min Jung
Attorney, Agent, or Firm—Frishauf, Holtz, Goodman & Woodward

[57] ABSTRACT

A bus-method communication network has a number of stations with assigned station numbers. An exclusive right or priority of transmission is transferred from a first station to a second station by transmission of an abort signal including synchronization information and a first address assigned to the first station. In each station, a waiting time is calculated from a first station number in the detected abort signal and the station number assigned to the receiving station. When the associated waiting time elapses, another station seizes priority as a second station and transmits a paging signal having a destination address following communication data. Each station is prevented from seizing transmission priority in response to reception of the paging signal, and the station having the destination address decodes the communication data. The second station thereafter transmits the abort signal. Each station monitors any signal on the transmission line after reception of the paging signal on the transmission line after reception of the paging signal, and measures times lapse over a period determined by its assigned address number when detecting no transmitted signal. The station having the smallest address number transmits the abort signal as a first station when the time period elapses. Each station can delay transmission of the abort signal by another time period determined by the total number of stations, when the second station has no communication data.

22 Claims, 13 Drawing Sheets

BUS-METHOD COMMUNICATION NETWORK SYSTEM CAPABLE OF SEIZING TRANSMISSION RIGHT BY USING TIMER MEANS AT EACH STATION

BACKGROUND OF THE INVENTION (1) Field of the Invention

This invention relates to a bus-method communication network system comprising a plurality of stations connected by a bus-method transmission path so as to commonly use the transmission path for mutual communication of the stations.

(2) Description of the Prior Art

A local area network communication system has been recently developed in order to connect a plurality of stations which are distributed in a relatively narrow area. A bus-method communication network system is a typical one of the local area network system.

The bus-method communication network system comprises a bus-method transmission path and the stations which are assigned with station numbers different from one another. The stations are commonly connected to the transmission path so as to commonly use the transmission path for mutual communication of the stations.

In the bus-method communication network system, contention occurs for seizing a transmission right or priority as is well known in the art. In order to resolve the contention, various methods have been already known in the art for accessing the transmission path, or seizing an exclusive transmission right.

A known access method is a carrier sense multiple access with collision detection (CSMA/CD) method. In the CSMA/CD method, each station always performs carrier detection on the transmission path. One station transmits a signal after confirming that none of other stations transmits any signal. On detection of collision, the station stops transmission of the signal and tries to retransmit the signal after the lapse of a random time period. However, the CSMA/CD method is disadvantageous in that processing is complicated for seizing the transmission right.

A polling protocol is another access method. In the polling protocol, a master controller is connected to the transmission path. The master controller transmits a polling sequence to one of the stations in order to poll or interrogate about absence or presence of a transmission request. The polled station transmits a data signal when the transmission request is present, while the polled station transmits a negative acknowledge in absence of the transmission request. Accordingly, the polling protocol is disadvantageous in that the bus-method communication network system is expensive because the master controller is necessary for polling the stations. In addition, it is impossible to effectively use the transmission path for increased number of stations. This is because the controller spends a lot of time for polling in comparison with actual communication.

A token passing method is still another access method. In the token passing method, a token is transferred along a predetermined logical ring of the stations one after another. A specific station in the logical ring seizes the exclusive transmission right by capture of the token. Then, the specific station sends out communication data to the transmission path if there are any, and sends out the token after the data are completely transmitted. In absence of data which should be transmitted, the specific station immediately transmits the token. In the token passing method, extinction and duplication of the token should be observed. Therefore, one or more supervising stations must be provided for monitoring the token and recovering the token from such faults, or one or more stations must be arranged to have such a supervising function. In addition, the logical ring must be dynamically determined for permitting another station to join to, or retire from, the logical ring, and the resultant logical ring must be maintained without fault. Accordingly, the token passing method is disadvantageous in that the bus-method communication network system is very expensive because the supervising is a very complex and difficult processing.

SUMMARY OF THE INVENTION

It is an object of this invention to provide a bus-method communication network system which is economical and can effectively use a bus-method transmission path with the exclusive transmission right or priority being reliably seized in each of the stations without duplication, and wherein each station is simple in arrangement and processing for seizing the transmission right.

The present invention is directed to a bus-method communication network system comprising a bus-method transmission path and a plurality of stations commonly connected to the transmission path for mutual communication therebetween, the stations being assigned with station numbers different from one another, a specific one of the stations having an exclusive transmission right to access to the transmission path at a specific time without the other stations being permitted to access thereto, the specific station transmitting an abort signal representative of abandonment of the exclusive transmission right to the transmission path, one of the other stations freshly seizing the exclusive transmission right by detecting the abort signal. According to the present invention, the system is characterized in that the specific station has, as a specific station number, a station number assigned thereto and the abort signal comprises synchronization information and the specific station number. In each one of the stations, station number memorizing means is provided for storing, as a preassigned station number, one of said station numbers assigned thereto. Receiver means is coupled with the transmission path for receiving a transmission signal on the transmission path. Abort signal detecting means is coupled with the receiver means for detecting the abort signal in the transmission signal received by the receiver means and extracting the specific station number in the abort signal as detected. The abort signal detecting means produces an abort detection signal and an address signal representative of the specific station number as extracted. Time calculating means is coupled with the station number memorizing means and the abort signal detecting means for calculating a first time period depending on the extracted specific station number and the preassigned station number to produce a first time data signal representative of the first time period. First time measuring means is responsive to the first time data signal and measures time to produce an output, as a first enabling signal, when the first time period elapses. Seizing decision means is responsive to the first enabling signal and decides permission of seizure of the exclusive transmission right to produce a seizing signal when the permission is decided, whereby one of the stations other than the specific station freshly seizes the exclusive transmission right.

Each one of the stations further comprises transmitter means coupled with the transmission path for transmitting a specific transmission signal to the transmission path and first data storing means for storing communication data to be transmitted to the transmission path. Transmission control means responsive to the seizing signal checks whether or not any communication data are in the first data storing means and sends out, when communication data are present, the communication data from the first data storing means to the transmitter means for the specific transmission signal. The transmission control means produces an abort control signal when any communication data are absent in the first data storing means. Abort signal send-out means stores the abort signal which comprises the synchronization information and the preassigned station number as the specific station number. The abort signal send-out means, in response to said abort control signal, sends out the abort signal to the transmitter means for the specific transmission signal.

Each one of the stations further comprises paging signal generating means responsive to a transmission control signal for sending out a paging signal to the transmitter means. The paging signal comprises destination address for designating a station as a destination station to which the communication data are transferred and enquiry information for requesting response to the paging signal for the destination station. The transmission control means produces the transmission control signal prior to sending out of the communication data.

Each one of the stations further comprises paging signal detecting means for detecting the paging signal in the transmission signal received by the receiver means to produce an output signal as a non-permission signal. The paging signal detecting means further extracts the destination address in the paging signal to produce a destination address signal representative of the destination address as extracted. The seizing decision means is coupled to the paging signal detecting means and holds a non-permission condition in response to the non-permission signal. The seizing decision means decides not permission but non-permission in response to the first enabling signal to change the non-permission to a permission condition without producing the seizing signal when the non-permission condition is held.

Each one of the stations further comprises coincidence detecting means coupled with the station number memorizing means and responsive to the destination address signal for detecting coincidence between the preassigned station number and the destination address as extracted. The coincidence detecting means produces a coincidence signal when the coincidence is detected. In response to the coincidence signal, reception control means produces a reception control signal. Second data storing means is responsive to the coincidence signal and stores communication data in the transmission signal received by the receiver means.

In each of the stations, the coincidence detecting means produces a non-coincidence signal when detecting no coincidence. Each station may further comprise signal monitoring means responsive to the non-coincidence signal for monitoring whether or not the transmission signal is present on the transmission path to produce a monitored signal when the transmission signal is present on the transmission path, time data generating means responsive to the monitored signal for generating a second time data signal, the second time data signal being representative of a predetermined second time period, and second time measuring means responsive to the second time data signal for measuring time to produce an output signal, as a second enabling signal, when the second time period elapses. The seizing decision means is also coupled with the second time measuring means and, in response to the second enabling signal, decides permission of seizure of the exclusive transmission right to produce the seizing signal when the permission is decided.

Each one of the stations may also comprise timer means operating in response to a timer start signal and producing a timer output signal after a predetermined time duration. The transmission control means is made to produce, in response to the seizing signal, the timer start signal when any communication data is absent in the first data storing means. The transmission control means is responsive to the timer output signal and further checks the first data storing means. Then, the transmission control means produces a first abort control signal when any communication data are absent in the first data storing means. The abort signal send-out means is responsive to the first abort control signal and sends out the abort signal to the transmitter means. The transmission control means is responsive to the seizing signal and/or the timer output signal and sends out on presence of the communication data in the first data storing means the communication data to the transmitter means for the specific transmission signal. The transmission control means produces a second abort control signal when the transmission of said communication data is completed. The abort signal send-out means also sends out the abort signal to the transmitter means in response to the second abort control signal.

DESCRIPTION OF THE PREFERRED EMBODIMENTS

Figure 1:
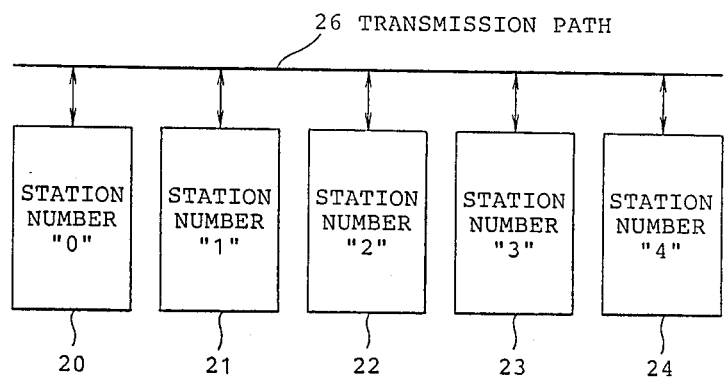
FIG. 1 is a block diagram view illustrating a bus-method communication network system according to the present invention.

Referring to FIG. 1, a bus-method communication network system according to this invention comprises a plurality of stations (five stations are shown by way of example only) 20-24. The stations 20 through 24 are assigned with the station numbers which are equal to "0" through "4", respectively. The stations 20 to 24 are commonly connected to a bus-method transmission path 26 of a serial data bus so as to commonly use the transmission path 26 for mutual communication of the stations 20 to 24.

At a specific time, a specific one of the stations 20 to 24 has the exclusive transmission right to transmit a paging signal E (FIG. 2) and thereafter its communication data to the transmission path 26. At that time, the other stations are prevented by reception of the paging signal from transmitting the data to the transmission path 26. When the specific station has no communication data to be transmitted or finishes transmission of the data, it transmits an abort signal S (FIG. 3) representative of abandonment of the exclusive transmission right to the transmission path 26. One of the other stations seizes the exclusive transmission right by detecting the abort signal S as will later be described.

Each station 20-24 is arranged similar to one another. Accordingly, description will be made as to an arrangement of one station according to an embodiment of the present invention with reference to FIG. 4.

Figure 4:
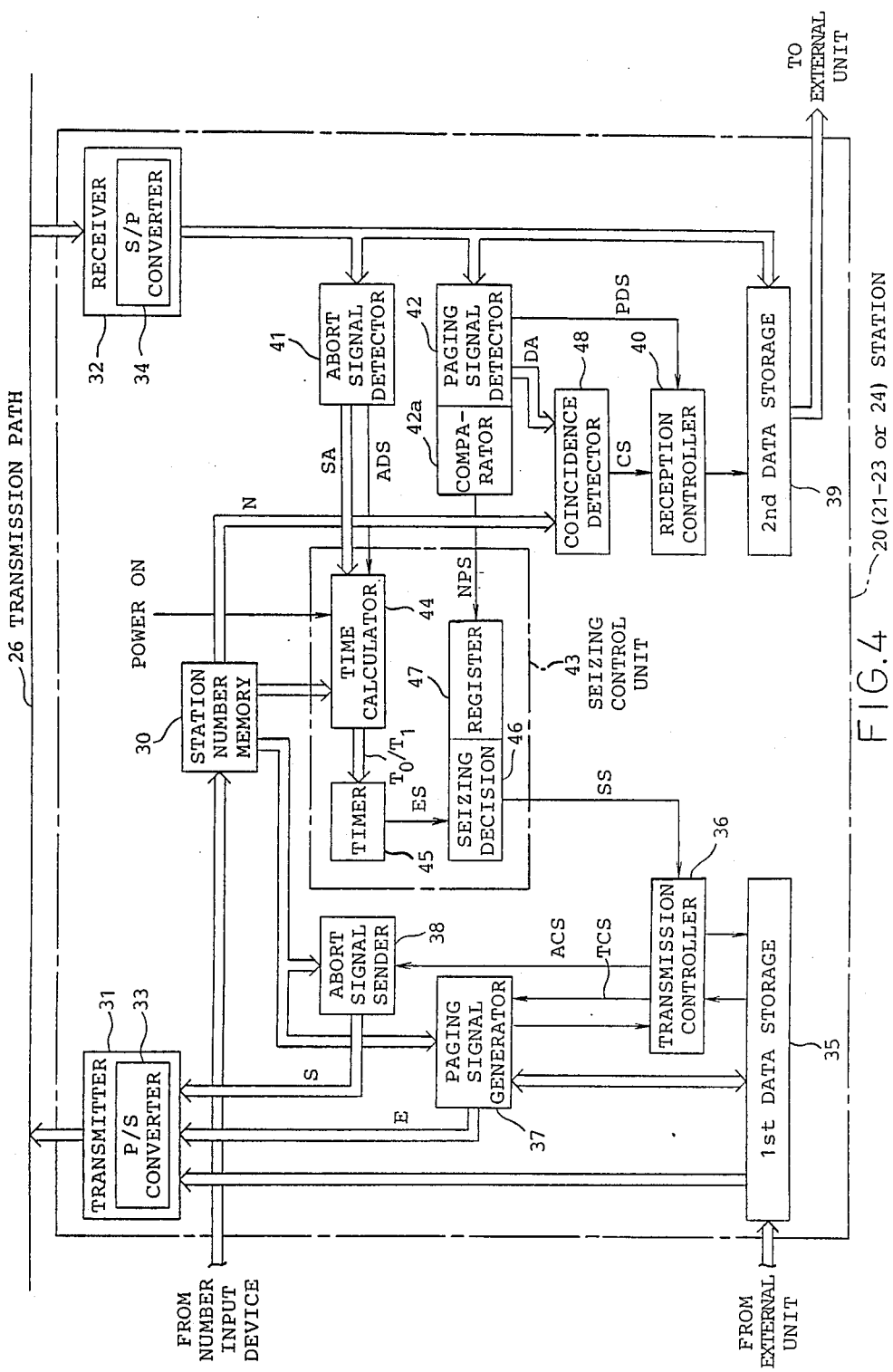
FIG. 4 is a block diagram view illustrating an arrangement for each station used in the system of FIG. 1, according to an embodiment of the present invention.

Referring to FIG. 4, the station comprises a station number memory 30 for storing the station number preassigned to the station. The station number is supplied to the station number memory 30 by means of, for example, a number input device such as a numerical selector switch or a ten-key device (not shown).

The station comprises a transmitter 31 for transmitting a transmission signal to the transmission path 26 and a receiver 32 for receiving the transmission signal transferred through the transmission path 26. The transmitter 31 is coupled with the transmission path 26 and has a parallel/serial (P/S) converter 33. The P/S converter 33 converts the transmission signal from a bit parallel to bit serial form and delivers the transmission signal of a bit serial form to the transmission path 26. The transmitter 31 also serves to convert logic code of the data into transmission code.

The receiver 32 is also coupled with the transmission path 26 and has a serial/parallel (S/P) converter 34 which converts the received signal from a bit serial to bit parallel form. The receiver 32 also converts the transmission code into the logic code. In this embodiment, the data of the bit parallel form comprises 8 bits in length.

The station comprises a first data storage 35 for storing communication data which is supplied from an external unit for transferring the data from the station to another station. The communication data are read to the transmitter 31 from the first data storage 35 under control of a transmission controller 36.

A paging signal generator 37 is coupled with the station number memory 30 and the first data storage 35. The paging signal generator 37 generates a paging signal E under control of the transmission controller 36.

Figure 2:
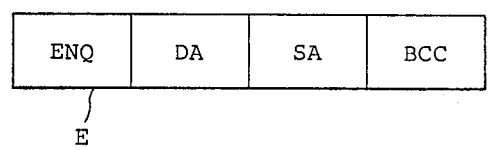
FIG. 2 is a view illustrating a format of a paging signal E used in the system of FIG. 1.

The paging signal E has a signal format as illustrated in FIG. 2. The signal format comprises an enquiry field ENQ in which enquiry information is inserted, a destination address field DA which identifies an address or a number of a station for which the communication data stored in the first data storage 35 are intended to be transmitted, a sender, source, or specific address field SA for identifying the station number preassigned to its own station, the check field BCC in which the check code is inserted. The inquiry information ENQ is for requesting a response to the paging signal for a station designated by the address in the destination address field.

Referring to FIG. 4 again, the station further comprises an abort signal sender 38 for sending out the abort signal S through the transmitter 31 to the transmission path 26 under control of the transmission controller 36, as will later be described.

Figure 3:
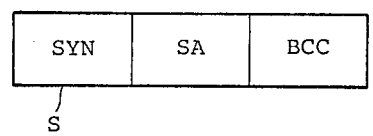
FIG. 3 is a view illustrating a format of an abort signal S used in the system of FIG. 1.

The abort signal S has a signal format as illustrated in FIG. 3. The signal format comprises a synchronization field SYN in which a synchronization code is inserted, the source or specific address field SA which has the station number N preassigned to its own station, and the check field BCC having the check code.

The signal fields and the corresponding signals may often be represented by the same reference symbols.

Returning to FIG. 4, the station further comprises a second data storage 39. The communication data are received by the receiver 32 and are stored in the second data storage 39 under control of a receiver controller 40. The communication data stored in the second data storage 39 is read out by an external unit (not shown) requiring the communication data.

To the receiver 32, an abort signal detector 41 and a paging signal detector 42 are connected in addition to the second data storage 39.

The abort signal detector 41 detects the abort signal S in the signal incoming thereto through the receiver 32. The abort signal detector 41 produces an abort detect signal ADS on detecting the synchronization field SYN, and then extracts the specific address SA in the detected abort signal S.

The paging signal detector 42 detects the paging signal E in the signal incoming thereto through the receiver 32. In detail, when the paging signal detector 42 detects the enquiry ENQ, it produces a paging detecting signal PDS representative of the enquiry character. When detecting the destination address DA, the paging signal detector 42 extracts the destination address DA. On detection of the specific address SA, the paging signal detector 42 compares the specific address SA and the preassigned station number N assigned to its own station and produces a non-permission signal NPS when the both are not coincident with each other. A comparator 42a for performing the comparing operation is shown in the block of the paging signal detector 42.

The station further comprises a seizing control unit 43 for controlling the transmission controller 36.

The seizing control unit 43 comprises a time calculator 44 and a time measuring circuit or a timer 45.

The time calculator 44 calculates an initial time period $T_0$ in response to a start signal or a power-on signal when the bus-method communication network is started up.

The initial time period $T_0$ is related to the preassigned station number N by;

$$T_0 = (N+1) \times t \qquad (1),$$

where t represents a predetermined short unit time.

Responsive to the abort detect signal and the extracted specific station number SA from the abort signal detector 41, the time calculator 44 also calculates a waiting time period $T_1$ which is related to a difference number between the specific station number SA and the preassigned station number N stored in the station number memory 30.

The waiting time period $T_1$ is defined by the following equation;

$$T_1 = (N - SA) \times t, \qquad \text{(for } N > SA\text{) or,} \qquad (2)$$
$$T_1 = (N - SA + W) \times t, \qquad \text{(for } N \leq SA\text{),}$$

where W represents the total number of the stations in the network system.

The initial time period $T_0$ and the waiting time period $T_1$ are set in the timer 45.

The timer 45 starts time measuring when a time period is set thereinto and produces an output signal when the set time period elapses. The timer 45 is a resetable type wherein a time period set therein can be changed from a previously set time period to another time period newly supplied thereto even before the previously set time period elapses.

Accordingly, after the initial timer period $T_0$ is set in the timer 45, the waiting time period $T_1$ can be set in the timer 45 without producing any output signal from the timer 45, when the waiting time period $T_1$ is supplied to the timer 45 before the initial time period $T_0$ elapses.

As the timer 45, a presetable pulse counter can be used which counts clock pulses up to a maximum value set therein and produces an output signal. When a fresh value is supplied to the counter during counting operation, the count is reset and the value is set as a new maximum value.

The control unit 43 further comprises a seizing decision circuit 46.

The seizing decision circuit 46 is for deciding whether or not its own station can seize the exclusive transmission right. The seizing decision circuit 46 is provided with a register 47 for maintaining the non-permission signal NPS from the comparator 42a in paging signal detector 42. When the seizing decision circuit 46 receives an output signal, as an enabling signal ES, from the timer 45, it checks the content of the register 47. When the register 47 has the non-permission signal NPS, the seizing decision circuit 46 delete the non-permission signal NPS in the register 47. When the register 47 does not have the non-permission signal NPS, the seizing decision circuit 46 produces a seizing signal SS to the transmission controller 36.

Responsive to the seizing signal SS, the transmission controller 36 checks whether any communication data are present or absent in the first data storage 35. The transmission controller 36 produces a transmitting control signal TCS when communication data to be transmitted are present in the first data storage 35. The transmission controller 36 produces an abort control signal ACS when data to be transmitted are absent in the first data storage 35.

In response to the abort control signal ACS, the abort signal sender 38 sends out the abort signal S through the transmitter 31 to the transmission path 26.

In response to the transmitting control signal TCS, the paging signal generator 37 generates the paging signal E which is sent out through the transmitter 31 to the transmission path 26. After the paging signal E is completed, the transmission controller 36 accesses the first data storage 35 to transmit the communication data from the first data storage 35 through the transmitter 31 to the transmission path 26. After the communication data stored in the first data storage 35 is sent out completely, the transmission controller 36 generates the abort control signal ACS, so that the abort signal sender 38 sends out the abort signal S to the transmission path 26.

The destination address DA extracted by the paging signal detector 42 is supplied to a coincidence detector 48 and is compared with the preassigned station number N stored in the station number memory 30. The coincidence detector 48 produces a coincidence signal CS when the coincidence is detected between the destination address DA and the preassigned station number N.

The coincidence signal is applied to the reception controller 40, and the reception controller 40 produces a reception control signal RCS to control the second data storage 39 so that the communication data received by the receiver 32 through the transmission path 26 are stored into the second data storage 39.

Operation of the bus-method communication network system of FIG. 1 with each station having the construction of FIG. 4 will be described below with reference to FIGS. 5-7.

At first, it is assumed that each station 20-24 has no communication data to be transmitted.

Figure 5:
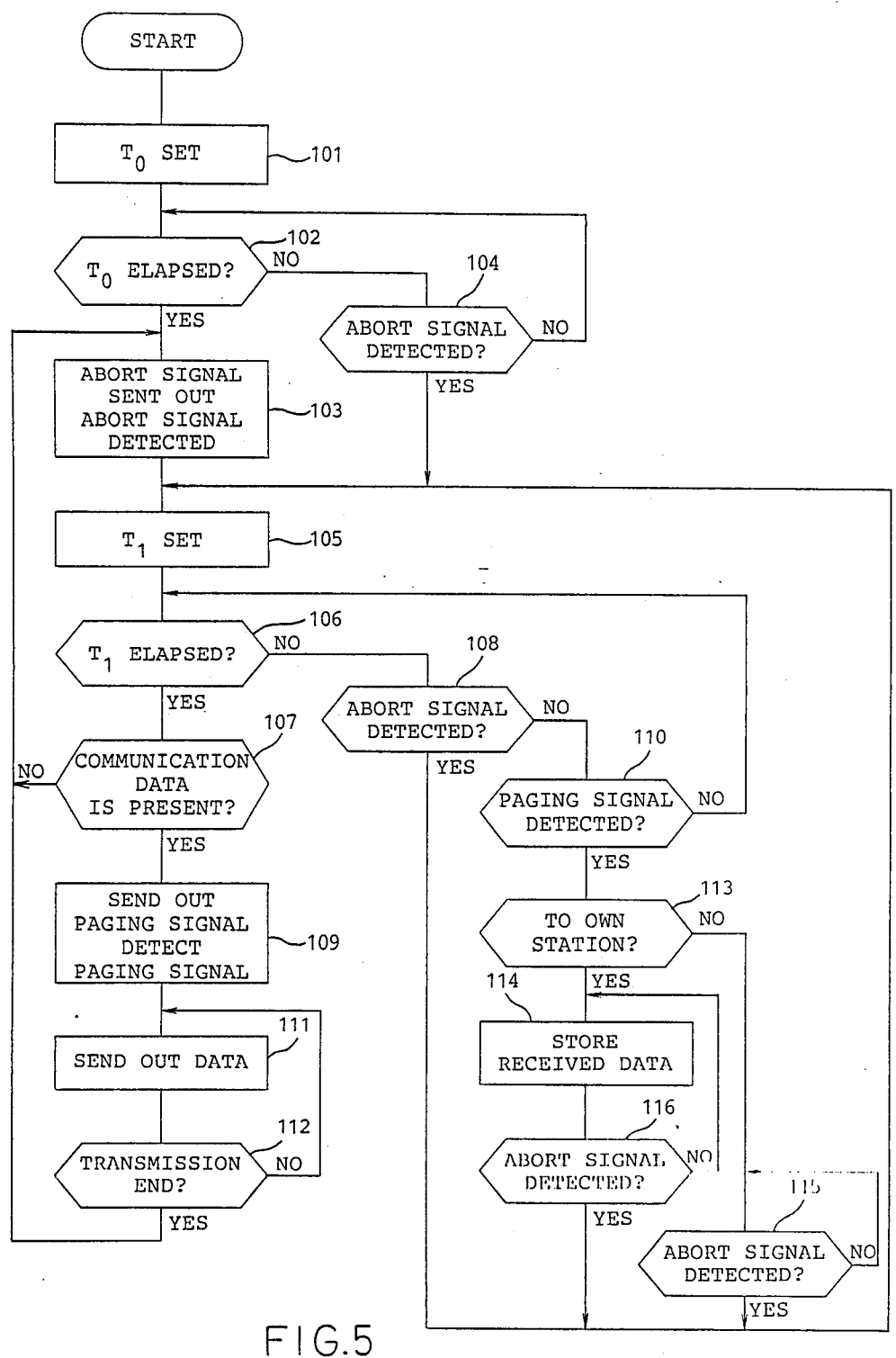
FIG. 5 is a flow chart illustrating operation of the system of FIG. 1 which uses the station arrangement of FIG. 4 for each station in the system.
Figure 6:
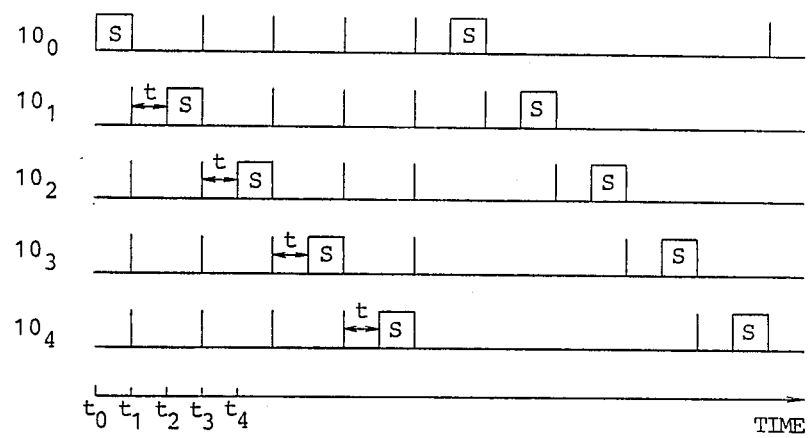
FIG. 6 is a time chart illustrating an example of operation of the system using the station arrangement of FIG. 4.

Referring to FIG. 6 together with FIG. 5, when the power is turned on in the bus-method network system of FIG. 1, the power-on signal is supplied to the time calculator 44 in each station. The time calculator 44 calculates the initial time period $T_0$ according to equation (1). Accordingly, the initial time periods $T_0(20)$, $T_0(21)$, $T_0(22)$, $T_0(23)$, and $T_0(24)$ of stations 20 to 24 are equal to t, 2t, 3t, 4t, and 5t, respectively, because stations 20-24 are assigned with the station numbers of "0" to "4", respectively. In each station 20-24, the initial time period $T_0$ is set in the timer 45 (step 101 in FIG. 5). The timer 45 starts the time measuring (step 102 in FIG. 5) and produces the enabling signal ES to the seizing decision circuit 46 when the initial time period $T_0$ elapses. The enabling signal ES is produced at first in station 20 having a station number "0". This is because the station 20 has the shortest initial time period $T_0(20) = t$.

In station 20, the seizing decision circuit 46 decides the seizing of the exclusive transmission right because the non-permission signal NPS is not yet stored in the register 47, and produces the seizing signal SS. The transmission controller 36 produces the abort control signal ACS because no communication data are stored in the first data storage 35. Thus, the abort signal sender 38 operates so that the station 20 sends out the abort signal S (FIG. 3) to the transmission path 26 at a time $t_0$ in FIG. 6 (step 103 in FIG. 5).

The abort signal S includes an address number "0" preassigned to the station 20 as the specific or source station number SA.

The abort signal S on the transmission path 26 is detected by the abort signal detector 41 in each station 20-24 (for station 20, step 103 and for stations 21-24, step 104 in FIG. 5). In each station, the abort signal detector 41 produces the abort detection signal ADS when the synchronization information SYN in the abort signal S is detected. Subsequently, the abort signal detector 41 extracts the specific station number or the source address SA in the abort signal S and delivers the specific station number SA (=0) to the time calculator 44.

The time calculator 44 calculates the waiting time period $T_1$ given by equation (2), which is set in the timer 45 (step 105 in FIG. 5) at a time $t_1$ in FIG. 6. In this case, the waiting time periods $T_1(20)$, $T_1(21)$, $T_1(22)$, $T_1(23)$, and $T_1(24)$ in stations 20 to 24 are 5t, t, 2t, 3t, and 4t, respectively, because the specific station number SA and the number W of the stations are "0" and "5", respectively, as mentioned before.

Then, the timer 45 in station 21 generates the enabling signal ES before timers in other stations provide the enabling signals (step 106 in FIG. 5), because the station 21 has the shortest waiting time period $T_1(21) = t$ at this stage, as described above. Accordingly, the seizing decision circuit 46 in the station 21 decides the seizing of the exclusive transmission right because the register 48 has not yet stored the non-permission signal NPS. Then, the transmission controller 36 in station 21 checks whether the communication data to be transmitted are present or absent in the first data storage 35 (step 107 in FIG. 5). In this case, since it is assumed that no communication data are in the first data unit 35, the transmission controller 36 produces the abort control signal ACS so that the abort signal sender 38 sends out the abort signal S through the transmitter 31 to the transmission path 26 (step 103 in FIG. 5).

Thus, the station 21 sends out the abort signal S at time $t_2$ after the unit time t from the time $t_1$ as shown at $10_1$ in FIG. 6. The abort signal S includes, as the specific station number or the source address SA, the station number "1" assigned to the station 21.

In each station 20-24, the abort signal S on the transmission path 26 is detected by the abort signal detector 41 (for station 21, step 103, for stations 20, 22-24, step 108 in FIG. 5), and the waiting time period $T_1$ is newly calculated at the time calculator 44 and set to the timer 45 at a time $t_3$ in FIG. 6 (step 105 in FIG. 5), in the similar manner as described above.

In this case, the waiting time periods $T_1(20)$, $T_1(21)$, $T_1(22)$, $T_1(23)$, and $T_1(24)$ in stations 20-24 are 4t, 5t, t, 2t, and 3t, respectively, because the specific station number SA and the number W of the total stations are equal to "1" and "5", respectively.

Accordingly, at a time after the unit time t from the time instant $t_3$, the station 22 sends out the abort signal S as shown at $10_2$ in FIG. 6 (step 103 after passing through steps 106 and 107 in FIG. 5), and the waiting time period $T_1$ is again newly calculated and set in the timer 45 in each station of 20-24, in the similar manner as described above.

Thereafter, the abort signal S is sequentially sent out to the transmission path 26 from stations 23, 24, 20, 21 and 22 one after another as shown in FIG. 6 in the similar manner as described above.

Now, description will be made as to a case where communication data are stored in the first data storage 35 in one of stations 20-24, for example, in the station 22, with reference to FIGS. 1, 2, 5, and 7.

As described above in connection with no communication data in each station, when the timer 45 in the station 22 produces the enabling signal ES and when the seizing decision circuit 46 produces the seizing signal SS, the abort signal S is sent out at a time $t_4$ as shown at $10_2$ in FIG. 6. However, when the transmission controller 36 detects (step 107 in FIG. 5) that communication data are stored in the first data storage 35, the transmission controller 36 produces not the abort control signal ACS but the data transmitting control signal TCS.

Figure 7:
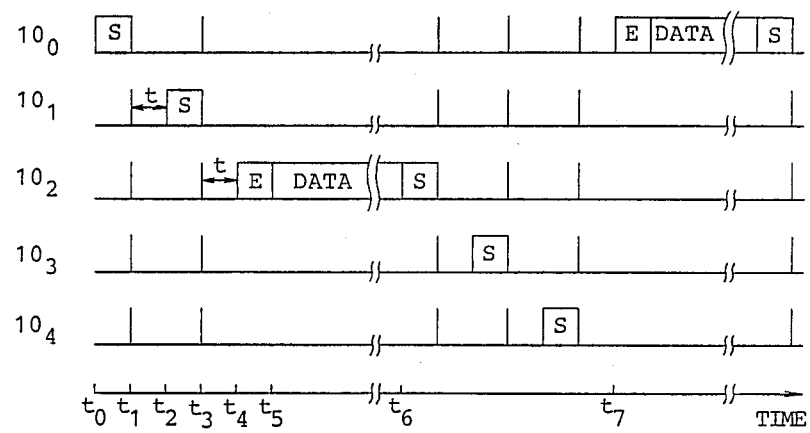
FIG. 7 is a time chart illustrating another example of operation of the same system.

In response to the data transmitting control signal TCS, the paging signal generator 37 sends out the paging signal E (FIG. 2) through the transmitter 31 to the transmission path 26 as shown at $10_2$ in FIG. 7 (step 109 in FIG. 5).

In the example being illustrated, it will be assumed that the paging signal E has, as the destination address DA, the station number, for example, "3" preassigned to the station 23 to which the communication data should be transferred from the station 22. In addition, the paging signal E has, as specific or source address SA, the preassigned station number N=2 assigned to the station 22.

After completion of transmission of the paging signal E, the transmission controller 36 accesses the first data storage 35 to send out the communication data onto the transmission path 26 through the transmitter 31 at a time instant $t_5$ in FIG. 7 (step 111 in FIG. 5).

The paging signal E on the transmission path 26 is detected by the paging signal detector 42 through the receiver 32 in each station of 20-24 (for station 22, step 109, for stations 20, 21, 23, and 24, step 110 in FIG. 5). The paging signal detector 42 in each station of 20-24 produces the paging detecting signal PDS representative of the enquiry code ENQ when the enquiry information ENQ in the paging signal E is detected. The paging detecting signal PDS is supplied to the reception controller 40. Subsequently, the paging signal detector 42 extracts the destination address DA in the paging signal E as detected and delivers the extracted destination address DA to the coincidence detector 48.

When the paging signal detector 42 further detects the sender or specific address SA in the paging signal E as received, it compares the specific address SA with the preassigned address N assigned to its own station at the station number comparator 42a.

In the described example, the station number comparator 42a in the station 22 detects that the specific address SA (=2) coincides with the preassigned station number N (=2). In each of the other stations 20, 21, 23, and 24, the station number comparator 42a produces the non-permission signal NPS to the register 47 since the specific address SA is not coincident with the preassigned station number N. Accordingly, each of the stations 20, 21, 23, and 24 cannot seize the exclusive transmission right even if the timer 45 produces the enabling signal ES thereafter. However, the register 47 is rewritten by the enabling signal ES from the non-permission state to the permission.

The coincidence detector 48 receives the destination address DA extracted by the paging signal detector 42 and detects coincidence of the received destination address DA and the preassigned station number N assigned to its own station (step 113 in FIG. 5).

In the present assumption, the coincidence detector 48 in the station 23 having a station address "3" produces the coincidence signal CS because the destination address DA is "3" as mentioned before. As a result, the reception controller 40 in the station 23 produces the reception control signal RCS to the second data storage 39 which stores the communication data received by the receiver 32 (step 114 in FIG. 5).

On the other hand, the coincidence detector 48 in each station of 20, 21, 22, and 24 except station 23 does not detect the coincidence. Accordingly, the reception controller 40 in each station of 20–22 and 24 does not operate.

Thus, transmission of the communication data from the station 22 to the station 23 is carried out. Then, each other station of 20, 21, and 24 is placed in a waiting step (115 in FIG. 5) for a fresh one of the abort signal S.

As mentioned above, the exclusive transmission right is not seized by the stations 20, 21, 23, and 24 except the station 22 which already seizes the exclusive transmission right and the single station 22 only can transmit the communication data. Therefore, it is possible to avoid contention for the exclusive transmission right between a plurality of stations.

In the station 22 sending out the communication data, when the transmission of the communication data is completed at the time $t_6$ as shown in FIG. 7 (step 112 in FIG. 5), the transmission controller 36 produces the abort control signal ACS to the abort signal sender 38. Then, the abort signal sender 38 sends out the abort signal S, which has the station number "2" as the specific station number SA, through the transmitter 31 to the transmission path 26 at $t_6$, as shown at $10_2$ in FIG. 7 (step 103 in FIG. 5).

The sent-out abort signal S on the transmission path 26 is detected by the abort signal detectors 41 through receiver 32 in all of the stations 20–24 (for station 22, step 103, for stations 20, 21, and 24, step 115, and for station 23, step 116 in FIG. 5).

In each station of 20–24, the abort signal detector 41 detects the synchronization information SYN in the abort signal S to produce the abort detecting signal ADS and, then, extracts the specific address or source address SA which is supplied to the time calculator 44. Subsequent operation is made in the manner similar to the above-mentioned operation.

In the example shown in FIG. 7, the station 20 transmits the paging signal E and the communication data when it seizes the exclusive transmission right.

In the embodiment, when the station, for example, 22 having the exclusive transmission right suffers from any fault after transmission of the paging signal E so that it cannot send out the abort signal S, any one of the other stations 20, 21, 23, and 24 cannot seize the exclusive transmission right and the network system is disadvantageously maintained in the non-operation condition.

Figure 8:
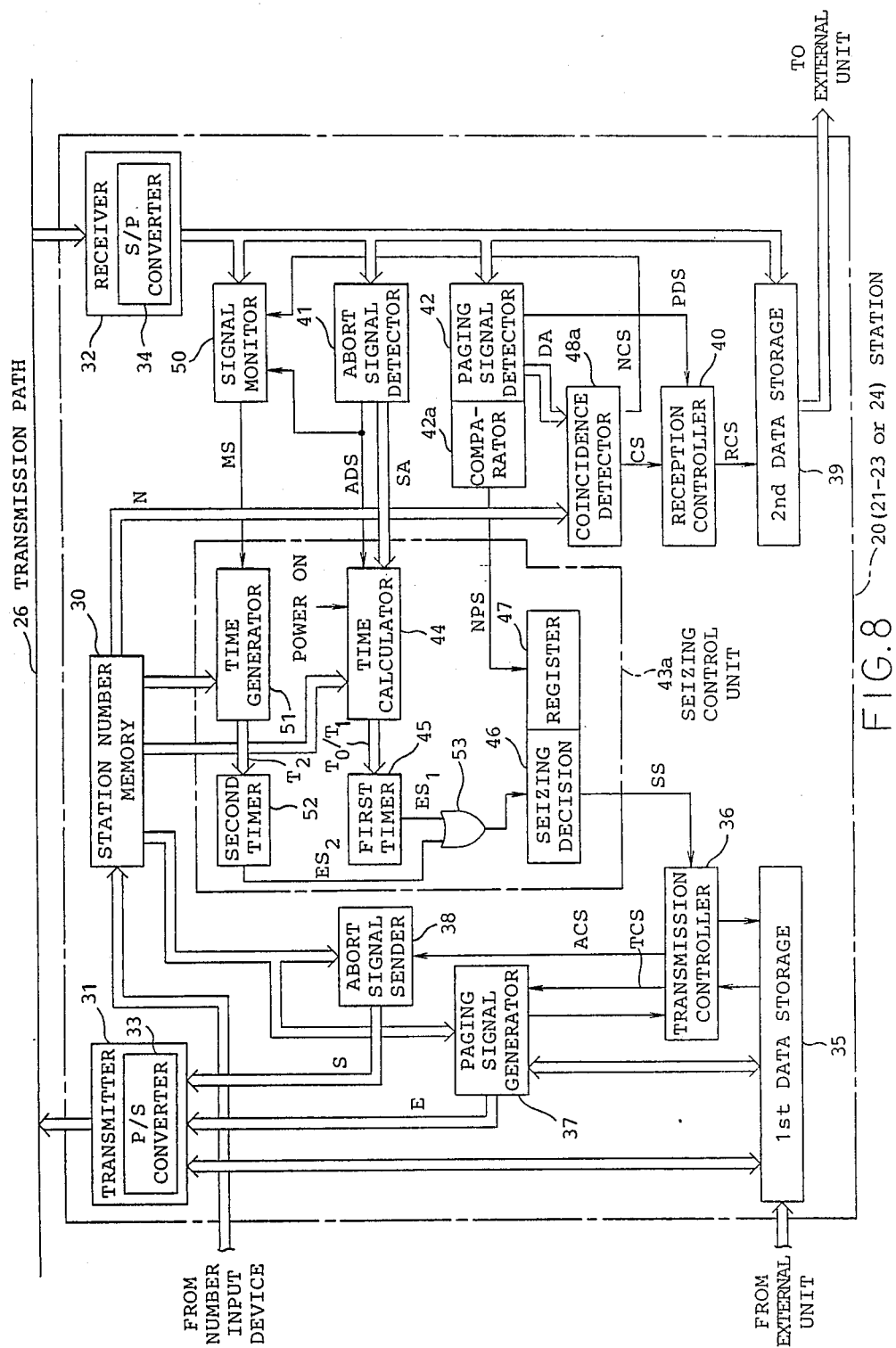
FIG. 8 is a block diagram view of another arrangement for each station used in the system of FIG. 1, according to another embodiment of the present invention.

Such a disadvantage can be avoided in another embodiment as shown in FIG. 8.

Referring to FIG. 8, the illustrated station according to another embodiment of the present invention is similar to that illustrated in FIG. 4 except for a signal monitor 50 and seizing control circuit portions accompanying thereto. The seizing control unit is, therefore, depicted at not 43 but 43a. The similar circuit portions are represented by the same reference numerals as in FIG. 4 and are not described in detail for the purpose of simplification of the description.

The signal monitor 50 is coupled with the receiver 32.

In the embodiment, the coincidence detector 48a is different from the coincidence detector 48 in FIG. 4 in that it produces a non-coincidence signal NCS when the coincidence is not detected. The non-coincidence signal NCS is applied to the signal monitor 50.

When receiving the non-coincidence signal NCS, the signal monitor 50 starts the monitoring operation for detecting any signal received from the transmission path 26 through the receiver 32. The signal monitor 50 produces a monitored signal MS when any signal is present. The signal monitor 50 stops the monitoring operation in response to the abort detection signal ADS from the abort signal detector 41.

The seizing control unit 43a a is provided with a time generator 51 and another timer 52 similar to the timer 45. Those timers 45 and 52 will be referred to as first timer and second timer, hereinafter.

In response to the monitored signal MS, the time generator 51 produces another waiting time period $T_2$ determined dependent on the preassigned station number N as will later be described. The waiting time periods $T_1$ and $T_2$ from the time calculator 44 and the time generator 51 will be referred to as the first and second waiting time periods, respectively, hereinafter.

The second waiting time period $T_2$ is defined by the following equation (3);

$$T_2 = (W+N) \times t \qquad (3).$$

The second waiting time period $T_2$ is set in the second timer 52. The second timer 52 starts the time measuring operation in response to setting of the second waiting time period $T_2$ and produces another enabling signal when the measured time period becomes equal to the second waiting time period $T_2$ set in the second timer 52.

The enabling signal provided from the first timer 45 will be called the first enabling signal $ES_1$, while the enabling signal from the second timer 52 will be referred to as the second enabling signal $ES_2$.

The second enabling signal $ES_2$ is applied to the seizing decision circuit 46 through an OR gate 53. The first enabling signal $ES_1$ from the first timer 45 is also applied to the seizing decision circuit 46 through the OR gate 53. Furthermore, the seizing decision circuit 46 produces the seizing signal SS also when receiving the second enabling signal $ES_2$.

Operation of the bus-method communication network system of FIG. 1 using the station arrangement of FIG. 8 will be described below with reference to FIGS. 9 and 10.

Figure 9:
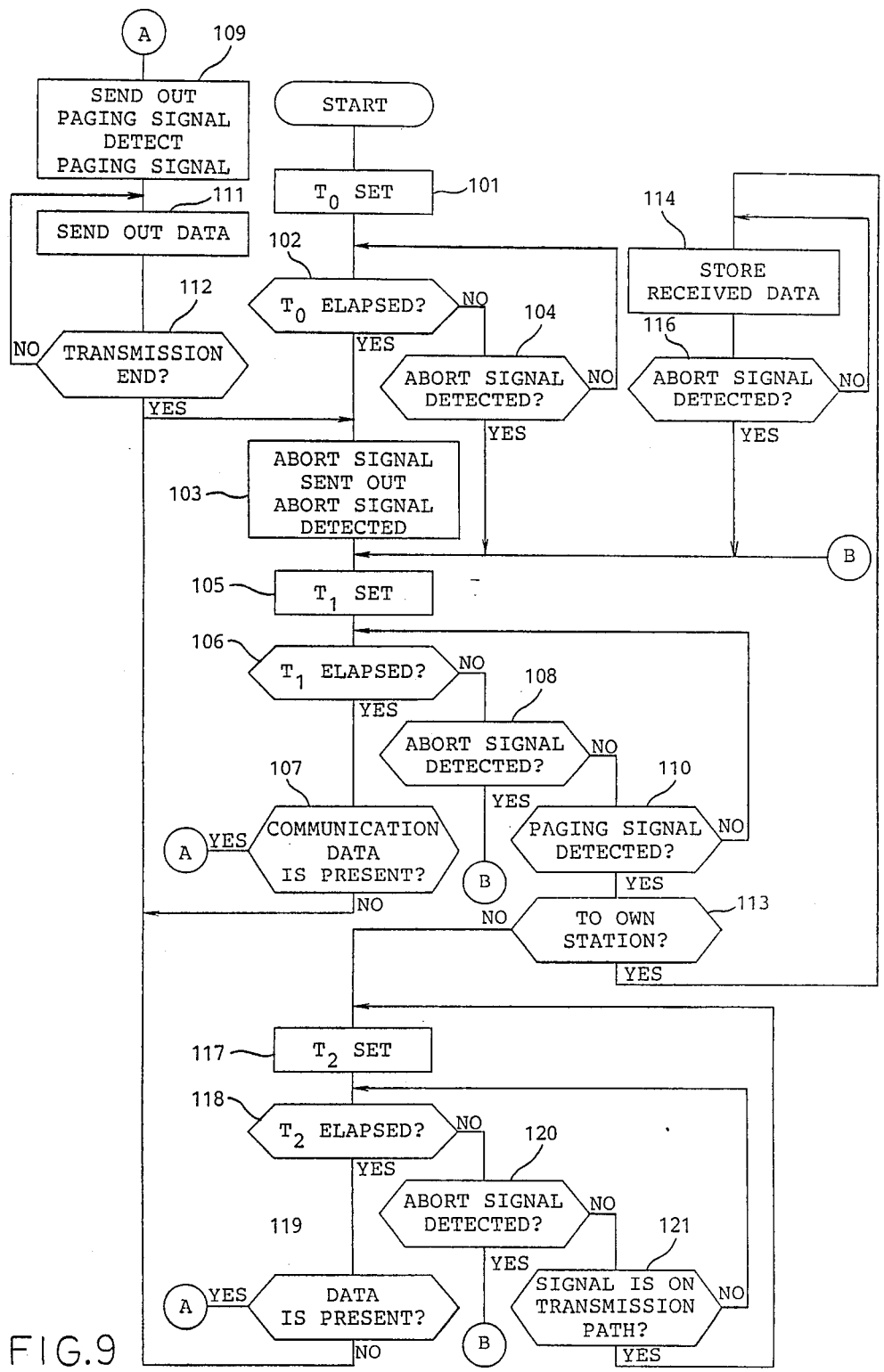
FIG. 9 is a flow chart illustrating operation of the system of FIG. 1 which uses the station arrangement of FIG. 8 for each station in the system.

The flow chart in FIG. 9 is similar to the flow chart in FIG. 5 except for steps 117–121 which are added in place of step 115 in FIG. 5 due to addition of the signal monitor 50, the time generator 51, and the second timer 52 in the embodiment of FIG. 8. The similar steps are represented by the same reference numerals in FIG. 5.

In case that any communication data to be trassmitted are absent in all of the stations 20–24, operation of the system is similar to that illustrated in FIG. 6 and therefore, its description is omitted. In case that the communication data to be transmitted to, for example, station 23 are present in any one of the stations, for example, station 22, operation is also similar to that illustrated in FIG. 7 if no fault occurs in the station 22 after the station 22 transmits the paging signal E and if the station 22 sends out the abort signal S after completion of transmission of the communication data.

Figure 10:
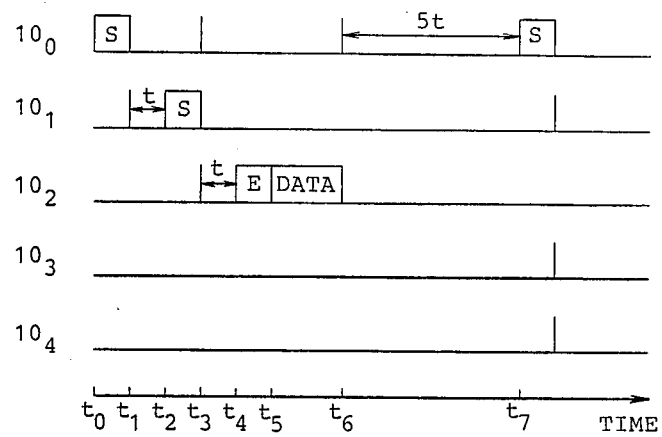
FIG. 10 is a time chart illustrating an example of operation of the system using the station arrangement of FIG. 8.

Referring to FIG. 10, when the paging signal E is sent out from the station 22 onto the transmission path 26 (step 109 in FIG. 9) at a time $t_4$ similar to the example in FIG. 7, the paging signal E is detected by the paging signal detector 41 in each of stations 20, 21, 23, and 24 (step 110 in FIGS. 5 and 9), as described above. Then, the coincidence detector 48a in the station 23 produces the coincidence signal CS but the coincidence detector 48a in each of the other stations 20, 21, and 24 produces the non-coincidence signal NCS (step 113 in FIG. 9). This is because the coincidence between the destination address DA and the preassigned station number N is not detected by the coincidence detector 48a in the stations 20, 21, and 24. Responsive to the non-coincidence signal NCS, the signal monitor 50 in each station of 20, 21, and 24 starts the monitoring operation and produces a monitored signal MS. In response to monitored signal MS, the time generator 51 generates the second waiting time period $T_2$ given by equation (3) at the time $t_5$ as shown in FIG. 10. The time $t_5$ is earlier than that time when the timer 45 in each station of 20, 21, and 24 will produce the first enabling signal $ES_1$. The second waiting time periods $T_2(20)$, $T_2(21)$, and $T_2(24)$ of the stations 20, 21, and 24 are 5t, 6t, and 9t, respectively. This is because the stations 20, 21, and 24 have the preassigned station numbers of "0", "1", and "4", respectively, and the number of stations W is "5".

In each station of 20, 21, and 24, the second waiting time period $T_2$ is set in the second timer 52 (step 117 in FIG. 9). Thereafter, the signal monitor 50 continues the signal monitoring operation (step 121 in FIG. 9). The signal monitor 50 also produces the monitored signal MS when any signal is present.

In response to the monitored signal, the time generator 51 again generates the second waiting time period $T_2$, which is again set into the second timer 52 (step 117 in FIG. 9). Therefore, the timers 52 in each station of 20, 21, and 24 are repeatedly set to the second waiting time period $T_2$ as long as any signal presents on the transmission path 26.

Thereafter, when the station 22 has no fault and finally sends out the abort signal S, the abort signal S is detected at each station of 20-24 (for stations 20, 21, and 24, step 120, for station 23, step 116, and for station 22, step 103 in FIG. 9), the operation normally continues as described before in connection with FIG. 5.

However, when any fault occurs at the station 22 and no signal is sent out to the transmission path 26 at $t_6$ in FIG. 10, the signal monitor 50 in each station of 20, 21 and 24 stops the monitored signal.

Therefore, the second timer 52 is not again set to the second waiting time period $T_2$ but produces the second enabling signal $ES_2$ when the second waiting time period $T_2$ elapses thereafter. Then, the timer 52 in the station 20 firstly produces the second enabling signal $ES_2$ earlier than the other stations because the station 20 has the shortest second waiting time period $T_2(=5t)$.

When the second enabling signal $ES_2$ is produced in station 20 (step 118 in FIG. 9), the seizing decision circuit 46 produces the seizing signal SS. Under the above-described control manner of the transmission controller 36 responsive to the seizing signal SS, the abort signal S is sent out from the station 20 (step 103 in FIG. 9) as shown at $10_0$ in FIG. 10, if there are no communication data to be transmitted (step 119 in FIG. 9). Alternatively, the paging signal E and the communication data are sent out from the station 20 (steps 119, 109, and 111 in FIG. 9) if there are communication data, and the abort signal S follows the communication data (step 103 in FIG. 9).

Thus, the operation of the network system continues thereafter with the faulty station 22 being omitted.

It is assumed in the above description that fault occurs in the station 22, but it will be noted that the network system is continued operative in the similar manner if fault occurs in the other one of stations or even in several ones of the stations.

In FIG. 8, although two separate timers 45 and 52 are used, it will be understood from the above-described operation that they can be replaced by a single timer.

Figure 11:
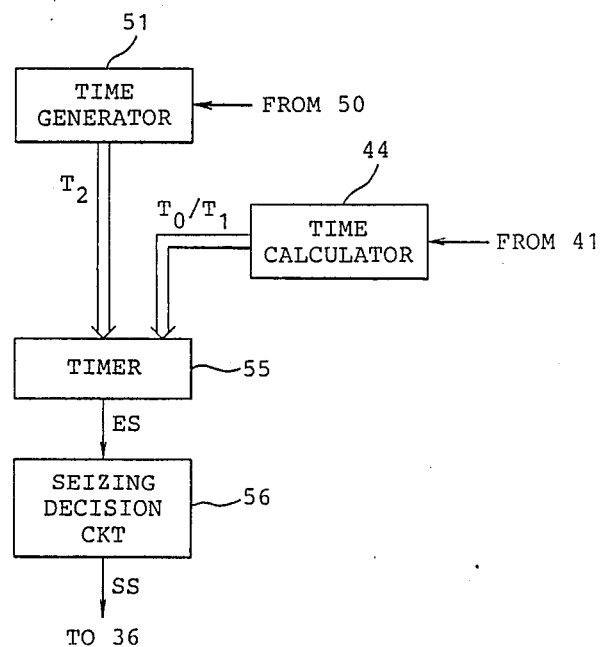
FIG. 11 is a block diagram illustrating a modification of a part in the arrangement of FIG. 8.

Referring to FIG. 11, a single timer 55 is a similar one as timers 45 and 51. The timer 55 is coupled to the time calculator 44 and the time generator 51 so that when either one of the initial and first time periods $T_0$ and $T_1$ and the second time period $T_2$ is supplied to the single timer 55, it is freshly set in the timer 55 with the previously set time period being cancelled.

The timer 55 supplies the enabling signal ES to a seizing decision circuit 56 similar to 46 in FIG. 4, when the last set time period elapses. The seizing decision circuit 56 produces the seizing signal SS in response to the enabling signal ES.

The seizing decision circuit 56 needs not have the register 47 which is used in the embodiment in FIG. 8, because the second time period $T_2$ is freshly set in the timer 55 when the paging signal E is detected so that the enabling signal production of the timer 55 is prolonged until the second time period $T_2$ elapses or until a fresh one of the first time period $T_1$ calculated in response to incoming of the next subsequent abort signal elapses.

Figure 12:
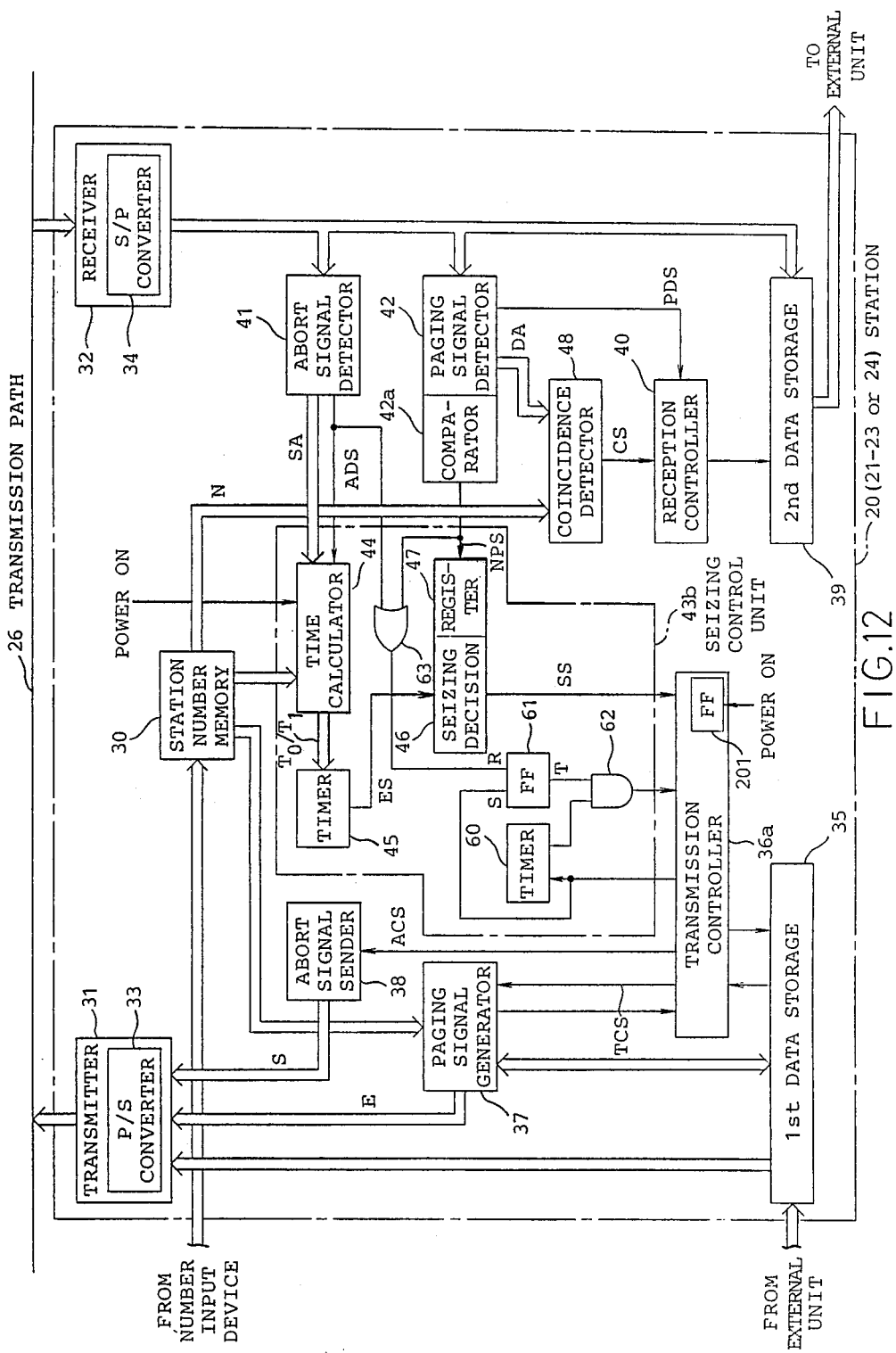
FIG. 12 is a block diagram view of still another arrangement for each station used in the system of FIG. 1, according to still another embodiment of the present invention.

Referring to FIG. 12, the illustrated station according to another embodiment of the present invention is similar to that illustrated in FIG. 4 except for a timer 60 and other portions accompanying thereto.

The similar portions are represented by the same reference numerals as in FIG. 4 and the detailed description thereto is omitted.

A seizing control unit 43b is different from the unit 43 in FIG. 4 and has the timer 60, an RS flipflop 61, an AND gate 62, and an OR gate 63 which are added into the seizing control unit 43 in FIG. 4.

A transmission controller 36a is different from the transmission controller 36 in FIG. 4 in that the transmission controller 36a does not produce the abort control signal ACS immediately when checking no data in the first data storage 35 in response to the seizing signal SS from the seizing decision circuit 46 but sets another waiting time period $T_3$ in the timer 60. The timer 60 will be called the third timer and the time period $T_3$ will be called the third waiting time period, hereinafter.

The transmission controller 36a in the station 20 having the smallest station number "0" has a flipflop 201 which is set by the power-on signal. When the flipflop 201 is set, the transmission controller 36a produces the abort control signal ACS immediately when receiving the seizing signal SS. Then, the flipflop 201 is reset by the seizing signal SS without setting the timer 60. Thereafter, the transmission controller 36a sets the timer 60 when checking no data in the first data storage 35 in response to the seizing signal SS.

The transmission controller 36a in each of the other stations 21-24 does not have such a flipflop.

The third waiting time period $T_3$ is not dependent on the station number but is constant for all of the stations. The third waiting time period $T_3$ is determined by the following equation (4);

$$T_3 = W \times t \quad (4).$$

The third timer 60 may be a presetable counter type similar to the first timer 45 and may be a fixed type having a fixed operation time period equal to $T_3$. In use of the presetable type, the third waiting time period $T_3$ is previously set into the timer. Even if either one of the two types is used, the transmission controller 36a applies only a start signal in response to the seizing signal SS to the timer 60, whereby the timer 60 operates time measuring and produces a timer output signal when the third waiting time $T_3$ elapses. The timer output signal is applied to the transmission controller 36a when the AND gate 62 is open.

In response to the timer output, the transmission controller 36a again checks the content of the first data storage 35 and produces abort control signal ACS when communication data to be transmitted are absent.

The transmission controller 36a applies the start signal to a set input terminal (s) of the RS flipflop 61 and sets the flipflop 61. A set output terminal (T) of the flipflop 61 is coupled to one input terminal of the AND gate 62. The timer output signal is applied to the other input terminal of the AND gate 62. An output terminal of the AND gate 62 is connected to the transmission controller 36a. Accordingly, the timer output signal is applied to the transmission controller 36a only when the flipflop 61 is in a set condition.

To a reset input terminal (R) of the flipflop 61, the abort detection signal ADS and the non-permission signal NPS are applied from the abort signal detector 41 and the paging signal detector 42, respectively, through the OR gate 63. Accordingly, when the abort signal S or the paging signal E is detected in the station during operation of the timer 60, the flipflop 61 is reset and the AND gate 62, thereafter, blocks the timer output signal.

In case that the first data storage 35 hasaany communication data to be transmitted, the transmitter controller 36a responsive to the timer output signal operates in the similar manner as the transmission controller 36 in FIG. 4.

Now, referring to FIGS. 13-16, description will be made as to operation of the bus-method communication network system using the station arrangement shown in FIG. 12 for each station.

Figure 13:
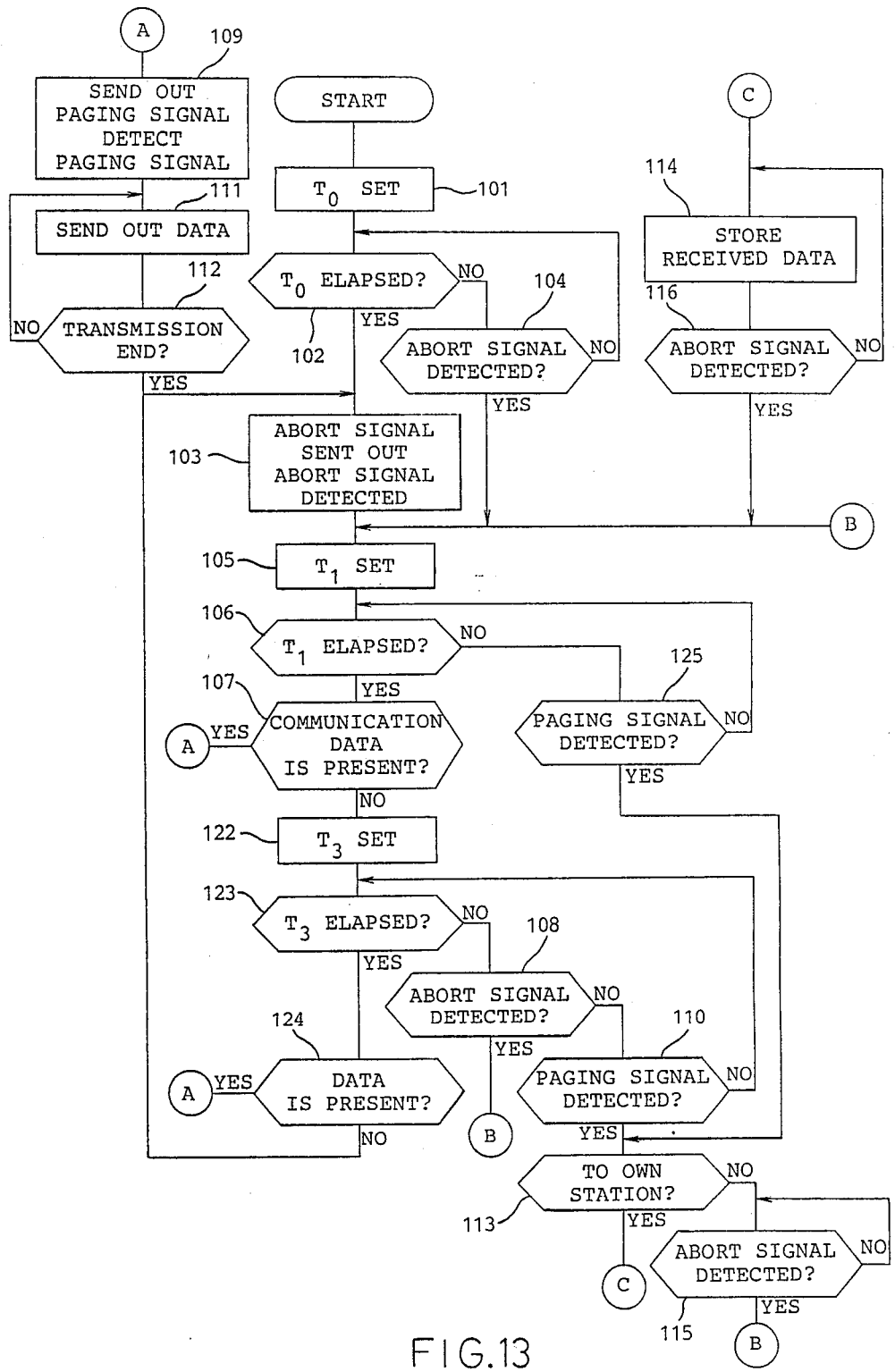
FIG. 13 is a flow chart illustrating operation of the system of FIG. 1 using the station arrangement of FIG. 12.

In FIG. 13, the similar steps are represented by the same reference numerals as in FIG. 5. It will be noted from comparison with FIG. 5 that steps 122-125 are added in the flow chart in FIG. 5. Further, step 108 is branched off from not step 106 but step 123 and a new step 125 is branched off from step 106. It will be understood from the above description that these differences are due to operation of the third timer 60 and the transmission controller 36a.

When the bus-method communication network system starts, power-on signal is applied to the time calculator 44 in each station of 20-24 and to the flipflop 201 in the station 20. Thereafter, the station 20 at first sends out the abort signal S to the transmission path 26 (steps 101-103 in FIG. 13) in the manner as described above in connection with the embodiment of FIG. 4 because the station 20 has the station number of N=0 and the flipflop 201 is set.

The flipflop 201 may not be omitted in the station 20. In that case, it takes longer time by the third waiting time period $T_3$ (step 123 in FIG. 13) in comparison with the embodiment of FIG. 4 until the station 20 sends out the abort signal S after start of the system.

Figure 14:
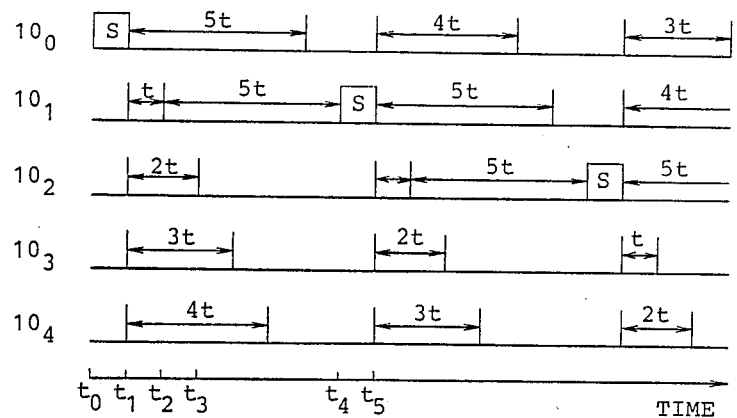
FIGS. 14-16 are views illustrating different examples of operation of the system using the station arrangement of FIG. 12.

In the station 20, the abort signal S is received (step 103 in FIG. 13) and the first waiting time period $T_1$ (=5t) is set in the first timer 45 as shown at $10_0$ in FIG. 14 (step 105 in FIG. 13) in the similar manner as the embodiment of FIG. 4.

Figure 15:
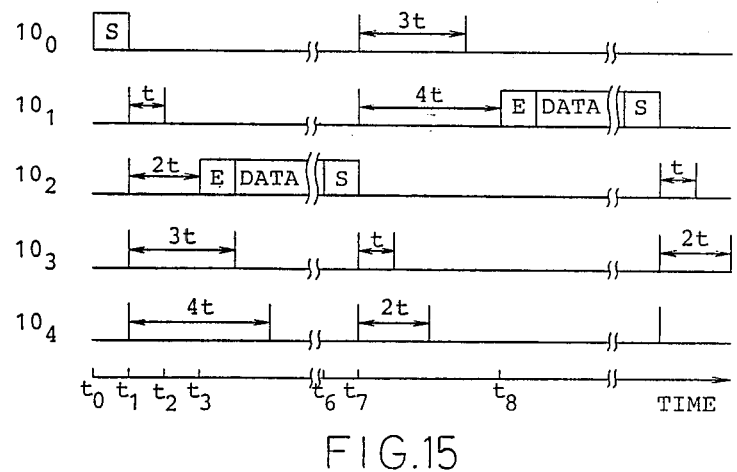
Figure 16:
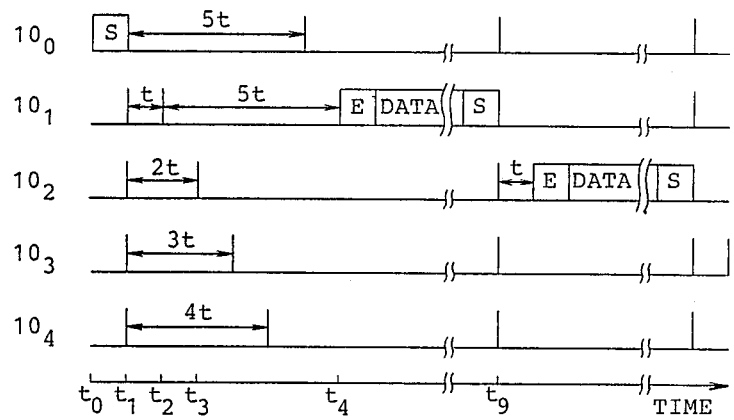

In each of the other stations of 21-24, the abort signal S sent out from the station 20 is detected and the first waiting time period $T_1$ ($T_1(21)=t$, $T_1(22)=2t$, $T_1(23)=3t$, and $T_1(24)=4t$) is set in the timer 45 of each station (steps 104 and 105 in FIG. 13) at $t_1$ in FIGS. 14-16 in the similar manner as the embodiment in FIG. 4.

Then, the enabling signal ES is produced from the timer 45 in the station 21 after lapse of the time period $T_1(21)$ and the seizing signal SS is produced from the seizing decision circuit 46 so that the transmission controller 36a checks the first data storage 35 (steps 106 and 107 in FIG. 13). When the first data storage 35 has no communication data, the transmission controller 36a drives the third timer 60 at $t_2$ in FIG. 14 (step 122 in FIG. 13) without sending out the abort signal S as described above. Accordingly, each station of 20-24 is different from the embodiment of FIG. 4 and the first timer 45 in each station is not reset.

Therefore, the first timer 45 in the station 22 next produces the enabling signal ES at a time instant $t_3$ in FIG. 14 when the first waiting time period $T_1(22)$ elapses after the time instant $t_1$. When the station 22 has no communication data, the abort signal S is not transmitted from the station 22, too, and the third waiting time period $T_3$ is also set in the third timer 60 in the station 22 (steps 106, 107 and 122 in FIG. 13).

In the similar manner, the timer 45 in each station of 23, 24, and 20 produces sequentially the enabling signal ES when the first waiting time period $T_1$ elapses after the time instant $t_1$, but no abort signal S is sent out from each station of 23, 24, and 20 and the third timer 60 in each station is set to the third waiting time period $T_3$, as shown at $10_3$, $10_4$, and $10_0$ in FIG. 14, when the stations 23, 24, and 20 have no communication data.

Thereafter, the third timer 60 in the station 21 produces the timer output signal at a time instant $t_4$ in FIG. 14 after the third waiting time period $T_3$ (=5t) from the time instant $t_2$. In response to the timer output signal, the station 21 sends out the abort signal S (steps 123, 124, and 103 in FIG. 13) as shown at $10_1$ in FIG. 14.

In response to the abort signal S sent out from the station 21, the timer 45 is set (for station 21, steps 103 and 105, for stations 20 and 22-24, steps 108 and 105 in FIG. 13) in each station 20-24 at a time instant $t_5$ in FIG. 14.

Thereafter, the similar operation as described above is repeated in the network system as long as all of the stations 20-24 have no communication data, while the station sending out abort signal S shifts from one station after another in the order of the station number with the time interval of 6t ($T_3+t$), as shown in FIG. 14.

Assuming that one station, for example, station 22 has communication data when its transmission controller 36a checks the first data storage 35 in response to the seizing signal SS (step 107 in FIG. 13), the transmission controller 36a produces the transmission control signal TCS at a time instant $t_3$ in FIG. 15. Then, the paging signal E and the communication data following the abort signal S are sequentially sent out from the station 22 (steps 109, 111, 112, and 103 in FIG. 13) as shown at $10_2$ in FIG. 15 in the similar manner as described above in connection with the embodiment of FIG. 4.

The paging signal E is detected at the other stations 20, 21, 23, and 24 (for stations 20 and 21, step 110, and for stations 23 and 24, step 125 in FIG. 13). Thereafter, the stations 20–24 operate (step 113, 115, 114, and 116) in the fashion similar to the operation of the stations in the embodiment of FIG. 4, until the abort signal S is sent out from the station 22 at a time instant $T_6$ in FIG. 15. In response to the abort signal S, the timer 45 in each station of 20–24 is set to the first waiting time period $T_1$ at the step 105 in FIG. 13, as shown at a time instant $t_7$ in FIG. 15.

In the example shown in FIG. 15, the station 21 is shown to have communication data when the seizing decision circuit 46 in the station 21 produces the seizing signal SS at a time instant $t_8$ in FIG. 15 after the time duration $T_1(21)$ (=4t) from the time instant $t_7$.

In a case where no paging signal E is sent out from any one of the stations 20–24 after the third timer 60 in one of stations 20–24, for example, station 21 starts at the time instant $t_2$ in FIG. 16, the timer output signal of the third timer 60 is received at the transmission controller 36a in the station 21 at the time instant $t_4$ in FIG. 16 (step 123 in FIG. 13), as described in connection with FIG. 14. Then, the transmitter controller 36a again accesses the first data storage 35 (step 124 in FIG. 13). When the first data storage 35 has communication data, the transmission controller 36a controls the paging signal generator 37 and the first data storage 35 to send out the paging signal E and the communication data from the station (steps 109 and 111 in FIG. 13) as shown at 101 in FIG. 16. Then, the abort signal S is sent out when the transmission of the communication data is completed (steps 112 and 103 in FIG. 13), as shown at $10_1$ in FIG. 16. In response to the abort signal S, the first timer 45 in each station is set to the first waiting time period $T_1$ at a time instant $t_9$ in FIG. 16 (step 105 in FIG. 13).

In the example shown in FIG. 16, the station 22 next seizes the exclusive transmission right after the first waiting time period $T_1$ (=t) elapses (step 106 in FIG. 13) and sends out the paging signal E, communication data, and the abort signal S to the transmission line 26 (steps 107, 109, 111, 112, and 103 in FIG. 13) as shown at $10_2$ in FIG. 16.

In this embodiment, shift of exclusive transmission right from one station having no communication data to another station can be faster than the embodiment of FIGS. 2 and 8 because the one station sends out no abort signal and the another station seizes the transmission right automatically when the first waiting time period elapses. In absence of communication data in all of the stations, the abort signal S is sent out from one station under control of the third timer 60 after the transmission right shifts from the one station and returns to the one station through the other stations sequentially. In presence of communication data, the abort signal S is also sent out after completion of transmission of the communication data.

Each timer of 45 and 60 in each of the stations is synchronized with one another by the abort signal S. Thus, contention between different stations for the exclusive transmission right can be reliably avoided.

Figure 17:
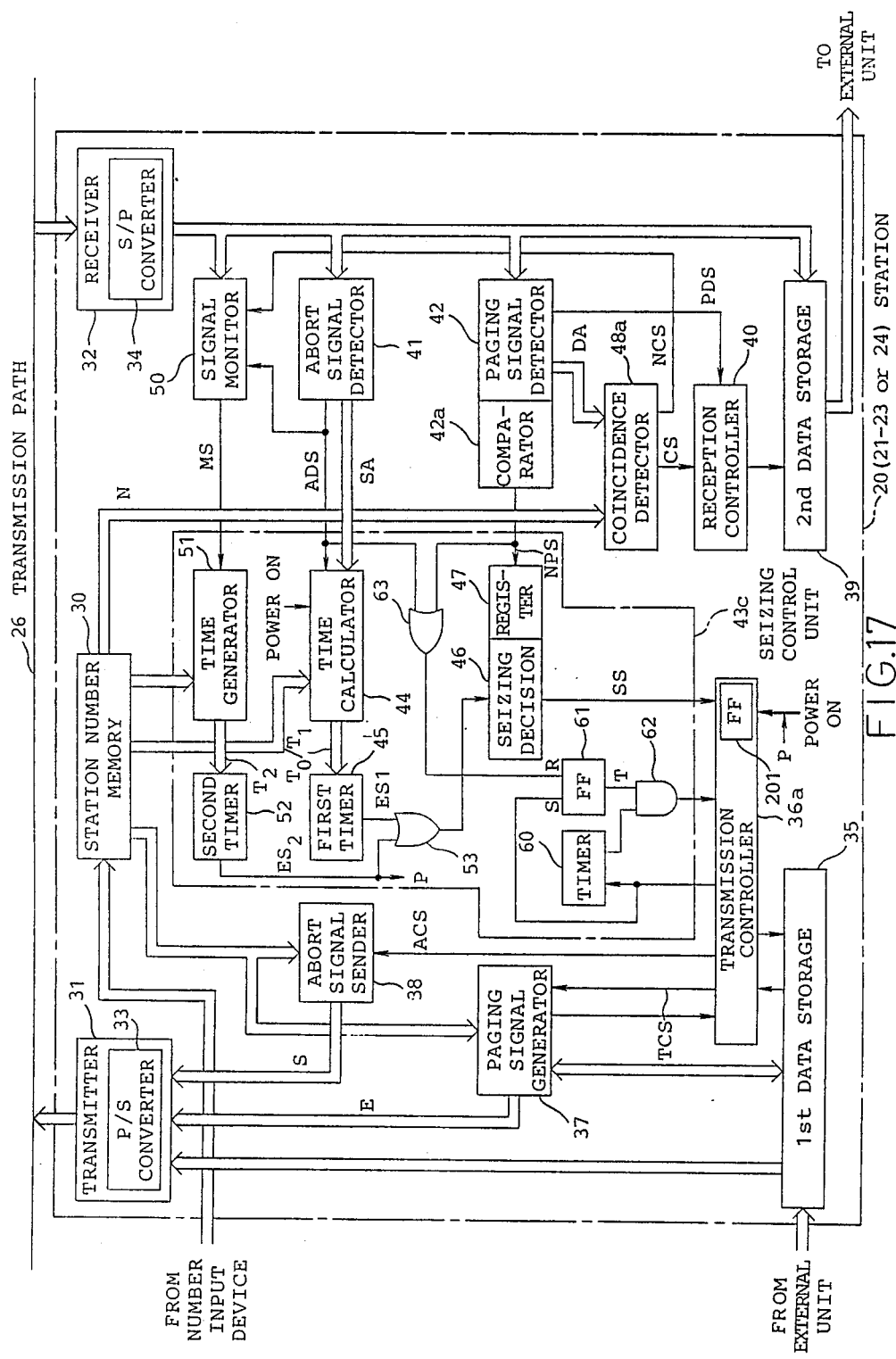
FIG. 17 is a further station arrangement for each station used in the system of FIG. 1.

FIG. 17 shows a further embodiment of a station used for each station of 20–24 in the system in FIG. 1. The station in FIG. 17 comprises the arrangement of the station of FIG. 12 and is characterized by addition of a signal monitor 50, a time generator 51, a second timer 52, and an OR gate 53 which are similar to those represented by the same reference numerals in FIG. 8. Therefore, similar portions of the station are represented by the same reference numerals in FIGS. 8 and 12, and description thereto is omitted for the purpose of simplification.

A seizing control unit 43c is different from that 43b in FIG. 12 by provision of the timer generator 51, the second timer 52, and the OR gate 53. However, it should be noted that the second enabling signal $ES_2$ is also coupled with the transmission controller 36 to set the flipflop 201. Therefore, after production of the second enabling signal $ES_2$, the transmission controller 36a does not set the third timer 60 but produces the abort control signal ACS immediately when receiving the seizing signal SS in response to the second enabling signal $ES_2$ if the first data storage 35 has no communication data.

Figure 18:
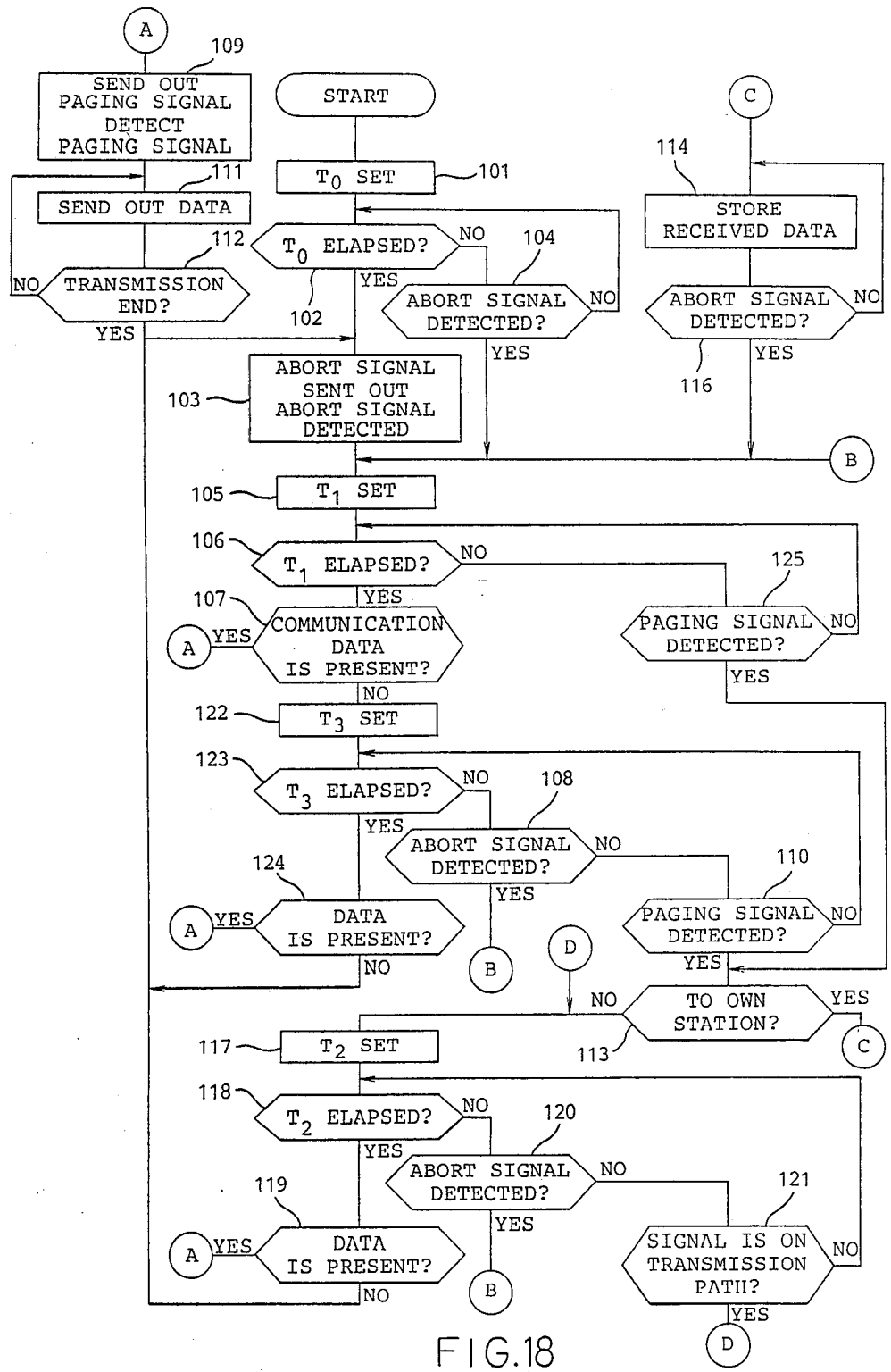
FIG. 18 is a flow chart illustrating operation of the system using the station arrangement of FIG. 17.

A flow chart of operation of a network system using the of stations FIG. 17 for each station of 20–24 in FIG. 1 is shown in FIG. 18. The flow chart is similar to the flow chart in FIG. 13 except that the series of steps 117–121 is added in place of step 115 in FIG. 13. The series of steps 117–121 are similar to the series of steps 117–121 in FIG. 9. Therefore, the bus-method communication network system using the station of FIG. 17 for each station of 20–24 in FIG. 1 operates in the similar manner as the system using the station of FIG. 12, as long as any fault does not occur in one of the stations seizing the exclusive transmission right after sending out the paging signal E. That is, when all of the stations 20–24 have no communication data in their first data storages 35, the operation is similar to that shown in FIG. 14. When one of the stations 20–24, for example, station 22 has communication data at step 107, operation of the system is similar to that of FIG. 15. Further, one of the stations 20–24, for example, station 21 has communication data at step 124, the operation of the system is similar to that shown in FIG. 16.

Figure 19:
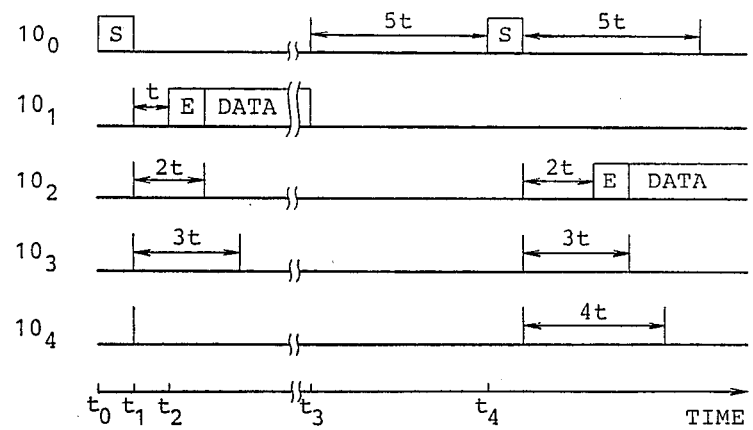
FIG. 19 is a time chart illustrating an example of operation of the system using the station arrangement of FIG. 17.

Referring to FIG. 19, operation of the system will be described as to a case where a fault occurs in one of the stations 20–21, for example, station 21 after sending out the paging signal E.

When the station 20 sends out the abort signal S at a time $t_0$ (step 103 in FIG. 18), the station 21 detects the abort signal S at a time instant $t_1$ (step 116, 108 or 120) and the first timer 45 in the station 21 is set to $T_1$ (=t) at step 105. After lapse of $T_1$ (=t), the paging signal E is sent out from the station 21 as shown at $10_1$ in FIG. 19 (step 109 in FIG. 18) when the first data storage 35 has communication data (step 107 in FIG. 18). Thereafter, the communication data are sent out from the station 21 (step 111 in FIG. 18), as shown at $10_1$ in FIG. 19. When a fault occurs in the station 21 during sending out communication data and when no signal, therefore, is on the transmission path 26 thereafter, setting operation (steps 121 and 117) of the second timer 52 in all of the stations is stopped because the time generator 51 is not actuated by the signal monitor 50. Thereafter, the second timer 52 in station 20 having the smallest station number "0" times up (at step 118 in FIG. 18) and produces the second enabling signal $ES_2$. In response to the second enabling signal $ES_2$, the flipflop 201 is set and the seizing decision circuit 46 produces the seizing signal SS. Then, the transmission controller 36a produces the abort signal ACS when the first data storage 35 of the station 20 has no communication data (step 119 in FIG. 18). At the same time, the flipflop 201 is reset. Then, the abort signal S is sent out from the station 20 as shown at 10₁ in FIG. 19 (step 103 in FIG. 18). Thereafter, the first timer 45 is set (step 105 in FIG. 18) in each station 20–24 except faulty station 21. It is of course true that when the first data storage 35 has communication data, the transmission controller 36a produces the transmission control signal TCS so that the paging signal E, the communication data, and the abort signal S are sequentially transmitted to the transmission path 26 (steps 119, 109, 111, 112, and 103 in FIG. 18). Therefore, the system continuously operates without station 21.

In the above description of FIG. 17, the second enabling signal ES₂ is also necessary to set the flipflop 201 by the second enabling signal ES₂. In that case, operation progresses from the step 119 to step 122 when the first data storage 35 has no communication data. Therefore, transmission of the abort signal S is delayed by the third waiting time period T₃.

The first timer 45 and the second timer 52 can be replaced by a single timer in the similar manner as shown in FIG. 11.

What is claimed is:

1. In a bus-method communication network system comprising a bus-method transmission path and a plurality of stations commonly connected to said transmission path for mutual communication, said stations being assigned with station numbers different from one another, a specific one of said stations having an exclusive transmission right to access to said transmission path at a specific time without the other stations being permitted access to said path, said specific station having means for transmitting an abort signal representative of abandonment of said exclusive transmission right to said transmission path so that one of the other stations can then seize the exclusive transmission right by detecting said abort signal, the improvement wherein:

said specific station has, as a specific station number, an assigned station number and said abort signal comprises synchronization information and the specific station number, each one of said stations comprising:

station number memorizing means for storing, as a preassigned station number, a corresponding one of said assigned station numbers;

receiver means coupled with said transmission path for receiving a transmission signal on said transmission path;

abort signal detecting means for detecting said abort signal in said transmission signal when received by said receiver means and for extracting said specific station number in said abort signal as detected, said abort signal detecting means producing an abort detection signal and an address signal representative of said specific station number as extracted;

time calculating means coupled with said station number memorizing means and said abort signal detecting means for calculating a first time period depending on said extracted specific station number and said preassigned station number to produce a first time data signal representative of said first time period;

first time measuring means responsive to said first time data signal for measuring time to produce an output, as a first enabling signal, when said first time period elapses; and seizing decision means responsive to said first enabling signal for deciding permission of seizure of the exclusive transmission right to produce a seizing signal when the permission is decided, wherein one of the stations other than said specific station can newly seize the exclusive transmission right.

2. A bus-method communication network system as claimed in claim 1, wherein the plurality of said stations number "W" which is an integer larger than 2, those W stations being assigned with said station numbers which are equal to "0" through "W-1", respectively, said time calculating means calculating said first time period T₁ according to the following equations;

$$T_1 = (N - SA) \times t \quad \text{(for } N > SA\text{) and}$$
$$T_1 = (N - SA + W) \times t \quad \text{(for } N > SA\text{),}$$

where t represents a predetermined unit time, N representing said preassigned station number, and SA being representative of said specific station number as extracted.

3. A bus-method communication network system as claimed in claim 1, wherein each of one of said stations further comprises:

transmitter means coupled with said transmission path for transmitting a specific transmission signal to said transmission path;

first data storing means for storing communication data to be transmitted to said transmission path;

transmission control means responsive to said seizing signal for checking whether or not any communication data are present in said first data storing means, said transmission control means including means for sending out, in the presence of communication data in said first data storing means, said communication data from said first data storing means to said transmitter means for said transmission signal, said transmission control means producing an abort control signal when any communication data are absent in said first data storing means; and abort signal send-out means coupled with said station number memorizing means and producing the abort signal which comprises said synchronization information and said preassigned station number as said specific station number, said abort signal send-out means responsive to said abort control signal for sending out said abort signal to said transmitter means for said specific transmission signal.

4. A bus-method communication network system as claimed in claim 3, wherein each one of said stations further comprises paging signal generating means responsive to a transmission control signal for sending out a paging signal to said transmitter means, said paging signal comprises a destination address for designating a station as a designation station to which said communication data are to be transferred and enquiry information for requesting a response to said paging signal for said destination station, said transmission control means producing said transmission control signal prior to sending out of said communication data.

5. A bus-method communication network system as claimed in claim 4, wherein each one of said stations further comprises paging signal detecting means for detecting said paging signal in said transmission signal received by said receiver means to produce a destination address signal representative of said destination address in the detected paging signal.

6. A bus-method communication network system as claimed in claim 5, wherein said paging signal detecting means produces an output signal as a non-permission signal when detecting said paging signal, said seizing decision means being coupled to said paging signal detecting means and holding a non-permission condition in response to said non-permission signal, said seizing decision means deciding not permission but non-permission in response to said first enabling signal to change said non-permission to a permission condition without producing said seizing signal when said non-permission condition being held.

7. A bus-method communication network system as claimed in claim 5, wherein each one of said stations further comprises:
coincidence detecting means being coupled with said station number memorizing means and responsive to said destination address signal for detecting coincidence between said preassigned station number and said destination address as extracted, said coincidence detecting means producing a coincidence signal when said coincidence is detected;
reception control means responsive to said coincidence signal for producing a reception control signal; and
second data storing means responsive to said coincidence signal for storing communication data in said transmission signal received at said receiver means.

8. A bus-method communication network system as claimed in claim 7, wherein each of said stations further comprises:
said coincidence detecting means producing a non-coincidence signal when detecting no coincidence;
signal monitoring means responsive to said non-coincidence signal for monitoring whether or not said transmission signal is present on said transmission path to produce a monitored signal when said transmission signal is present on said transmission path; and
time data generating means responsive to said mnitored signal for generating a second time data signal, said second time data signal being representative of a predetermined second time period.

9. A bus-method communication network system as claimed in claim 8, wherein a number of said plurality of stations number by "W" which is an integer larger than 2, those W stations being assigned with said station numbers which are equal to "0" through "W-1", respectively, said second time period $T_2$ being determined by the following equation;

$$T_2 = (N+W) \times t,$$

where t represents a predetermined unit time, and N represents said preassigned station number.

10. A bus-method communication network system as claimed in claim 9, wherein said first time measuring means is coupled with said time data generating means, said first time measuring means is reset in response to said second time data signal and restarts time measuring to produce said first enabling signal when said second time period elapses, and said seizing decision means produces said seizing signal in response to said first enabling signal.

11. A bus-method communication network system as claimed in claim 9, wherein each one of said stations further comprises:
second time measuring means responsive to said second time data signal for measuring time to produce an output, as a second enabling signal, when said second time period elapses; and
said seizing decision means being also coupled with said second time measuring means and responsive to said second enabling signal for deciding permission of seizure of the exclusive transmission right to produce said seizing signal when the permission is decided.

12. A bus-method communication network system as claimed in claim 2, wherein each one of said stations further comprises:
transmitter means coupled with said transmission path for transmitting a specific transmission signal;
timer means operating in response to a timer start signal and producing a timer output signal after a predetermined time duration;
first data storing means for storing communication data to be transmitted to said transmission path;
transmission control means responsive to said seizing signal for checking whether or not any communication data are present in said data storing means to produce said timer start signal when any communication data is absent in said first data storing means, said transmission control means responsive to said timer output signal further checking said first data storing means and producing a first abort control signal when any communication data are absent in said first data storing means; and
abort signal send-out means coupled with said station number memorizing means and producing the abort signal which comprises said synchronization information and said preassigned station number as said specific station number, said abort signal send-out means responsive to said first abort control signal for sending out said abort signal to said transmitter means for said specific transmission signal.

13. A bus-method communication network system as claimed in claim 12, wherein said predetermined time duration $T_3$ is determined by the following equation;

$$T_3 = W \times t.$$

14. A bus-method communication network system as claimed in claim 12, wherein said transmission control means responsive to said seizing signal and/or said timer output signal sends out on presence of said communication data in said first data storing means said communication data to said transmitter means for said specific transmission signal, said transmission control means producing a second abort control signal when the transmission of said communication data is completed;
said abort signal send-out means also sending out said abort signal to said transmitter means in response to said second abort control signal.

15. A bus-method communication network system as claimed in claim 14, wherein each one of said stations further comprises timer blocking means responsive to said abort detection signal for blocking said timer output signal when said abort signal detecting means detects said abort signal during said timer means operates.

16. A bus-method communication network system as claimed in claim 15, wherein each one of said stations further comprises paging signal generating means responsive to a transmission control signal for sending out a paging signal to said transmitter means, said paging signal comprising a destination address for designating a station as a destination station to which said communication data are transferred and enquiry information for requesting a response to said paging signal for said destination station, said transmission control means producing said transmission control signal prior to sending out of said communication data.

17. A bus-method communication network system as claimed in claim 16, wherein each one of said stations further comprises:
paging signal detecting means for detecting said paging signal in said transmission signal received by said receiver means to produce an output signal as a non-permission signal, said paging signal detecting means further extracting said destination address in said paging signal to produce a destination address signal representative of said destination address as extracted;
said seizing decision means being coupled to said paging signal detecting means and holding a non-permission condition in response to said non-permission signal, said seizing decision means deciding not permission but non-permission in response to said first enabling signal to change said non-permission to a permission condition without producing said seizing signal when said non-permission condition kept; and
said timer blocking means also blocking said timer output signal when paging signal detecting mans detects said paging signal during said timer operates.

18. A bus-method communication network system as claimed in claim 17, wherein said timer blocking means comprises:
flipflop circuit means having an output terminal, a first input terminal coupled with said abort signal detecting means and said paging signal detecting means, and a second input terminal coupled with said transmission control means, said flipflop circuit means being set in response to said abort detection signal and/or said non-permission signal and producing a gate closing signal on said output terminal, said flipflop circuit means being reset in response to said timer start signal to produce a gate opening signal at said output terminal; and
an AND gate having a first gate input terminal coupled with said timer means, a second gate input terminal coupled with said output terminal of said flipflop circuit means, and a gate output terminal coupled with said transmission control means, said AND gate permitting said timer output signal to be applied to said transmission control means through said gate output terminal when said gate opening signal is suppled to said second gate input terminal, but blocking said timer output signal when said gate closing signal is supplied to said second gate input terminal.

19. A bus-method communication network system as claimed in claim 17, wherein each one of said stations further comprises:
coincidence detecting means coupled with said station number memorizing means and responsive to said destination address signal for detecting coincidence between said preassigned station number and said destination address as extracted, said coincidence detecting means producing a coincidence signal when said coincidence is detected;
reception control means responsive to said coincidence signal for producing a reception control signal; and
second data storing means responsive to said coincidence signal for storing communication data in said transmission signal received by said receiver means.

20. A bus-method communication network system as claimed in claim 19, wherein each one of said stations further comprises:
said coincidence detecting means producing a non-coincidence signal when detecting no coincidence;
signal monitoring means responsive to said non-coincidence signal for monitoring whether or not said transmission signal is present on said transmission path to produce a monitored signal when any signal is present on said transmission path;
time data generating means responsive to said monitored signal for generating a second time data signal, said second time data signal being representative of a predetermined second time period;
second time measuring means responsive to said second time data signal for measuring time to produce an output, as a second enabling signal, when said second time period elapses; and
said seizing decision means being also coupled with said second time measuring means and responsive to said second enabling signal for deciding permission of seizing of the exclusive transmission right to produce said seizing signal when the permission is decided.

21. A bus-method communication network system as claimed in claim 20, wherein said plurality of stations number "W" which is an integer larger than 2, those W stations being assigned with said station numbers which are equal to "0" through "W-1", respectively, said second time period $T_2$ being determined by the following equation;

$$T_2 = (N+W) \times t,$$

where t represents a predetermined unit time, and N represents said preassigned station number.

22. A bus-method communication network system as claimed in claim 20, wherein each one of said stations further comprises:
holding means being coupled with said second time measuring means and responsive to said second enabling signal for being set to hold a set condition, said holding means being coupled with said seizing decision means and being reset to hold a reset condition; and
said transmission control means producing, in response to said enabling signal, said abort control signal without producing said start signal when said first data storing means has no communication data.

* * * * *